United States Patent
Narayanan et al.

(10) Patent No.: US 9,559,948 B2
(45) Date of Patent: Jan. 31, 2017

(54) SYSTEM AND METHOD FOR MANAGING UNKNOWN FLOWS IN A FLOW-BASED SWITCHING DEVICE

(75) Inventors: Rajesh Narayanan, San Jose, CA (US); Saikrishna Kotha, Austin, TX (US); Robert L. Winter, Leander, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 279 days.

(21) Appl. No.: 13/596,564

(22) Filed: Aug. 28, 2012

(65) Prior Publication Data

US 2013/0223442 A1    Aug. 29, 2013

Related U.S. Application Data

(63) Continuation-in-part of application No. 13/408,444, filed on Feb. 29, 2012.

(51) Int. Cl.
| | |
|---|---|
| *H04L 12/721* | (2013.01) |
| *H04L 12/947* | (2013.01) |
| *H04L 12/933* | (2013.01) |
| *H04L 12/851* | (2013.01) |
| *H04L 12/24* | (2006.01) |
| *H04L 12/771* | (2013.01) |
| *H04L 12/715* | (2013.01) |
| *H04L 29/06* | (2006.01) |

(Continued)

(52) U.S. Cl.
CPC ........... *H04L 45/38* (2013.01); *H04L 41/0803* (2013.01); *H04L 45/563* (2013.01); *H04L 45/64* (2013.01); *H04L 47/2483* (2013.01); *H04L 49/15* (2013.01); *H04L 49/25* (2013.01); *H04L 29/0653* (2013.01); *H04L 45/60* (2013.01); *H04L 49/45* (2013.01); *H04L 49/70* (2013.01); *H04L 69/22* (2013.01)

(58) Field of Classification Search
None
See application file for complete search history.

(56) References Cited

U.S. PATENT DOCUMENTS 7,274,700 B2     9/2007  Jin et al.
7,299,296 B1 *  11/2007  Lo et al. ................. 709/238
(Continued)

OTHER PUBLICATIONS

"Split Plane Architecture, Building the Next-Generation Packet Infrastructure," © 2000 Network Equipment Technologies, Inc., 2000  http://www.at2.com/downloads/documents/all_others/net_splitplane_architecture_wp.pdf.
(Continued)

*Primary Examiner* — Joshua A Kading
(74) *Attorney, Agent, or Firm* — Larson Newman, LLP

(57) ABSTRACT

A network switching device includes a macroflow sub-plane that performs packet-based routing in the network switching device and a microflow routing module that performs flow-based routing in the network switching device. The microflow routing module is separable from the network switching device and operates to provide a data packet via a software defined network agent to an SDN controller. The data packet is associated with a first unknown flow on the network switching device. The microflow routing module further operates to receive via the SDN agent a flow-based routing rule from the SDN controller and route the data packet based upon the flow-based routing rule.

19 Claims, 7 Drawing Sheets

(51) Int. Cl.
*H04L 12/931* (2013.01)
*H04L 12/773* (2013.01)

(56) References Cited

U.S. PATENT DOCUMENTS

| | | | | |
|---|---|---|---|---|
| 8,300,532 | B1* | 10/2012 | Venkatramani et al. | 370/235 |
| 2005/0097097 | A1* | 5/2005 | Hunt et al. | 707/3 |
| 2005/0152284 | A1 | 7/2005 | Kotha et al. | |
| 2006/0112219 | A1 | 5/2006 | Chawla et al. | |
| 2007/0058632 | A1* | 3/2007 | Back et al. | 370/392 |
| 2007/0266110 | A1 | 11/2007 | Chawla et al. | |
| 2008/0040376 | A1 | 2/2008 | Reeves et al. | |
| 2008/0104085 | A1* | 5/2008 | Papoutsakis et al. | 707/100 |
| 2008/0288664 | A1 | 11/2008 | Pettey et al. | |
| 2008/0291923 | A1* | 11/2008 | Back et al. | 370/396 |
| 2009/0049160 | A1 | 2/2009 | Cherian et al. | |
| 2009/0112877 | A1 | 4/2009 | Cherian et al. | |
| 2009/0144463 | A1 | 6/2009 | Cherian et al. | |
| 2009/0164769 | A1 | 6/2009 | Cherian et al. | |
| 2009/0165097 | A1 | 6/2009 | Cherian et al. | |
| 2009/0232137 | A1 | 9/2009 | Cherian et al. | |
| 2009/0327675 | A1 | 12/2009 | Cherian et al. | |
| 2010/0057908 | A1 | 3/2010 | Smith et al. | |
| 2010/0077066 | A1 | 3/2010 | Chawla et al. | |
| 2010/0138642 | A1 | 6/2010 | Cherian et al. | |
| 2010/0146039 | A1 | 6/2010 | Lo et al. | |
| 2010/0165877 | A1 | 7/2010 | Shukla et al. | |
| 2010/0180274 | A1* | 7/2010 | Cherian et al. | 718/1 |
| 2011/0103259 | A1* | 5/2011 | Aybay et al. | 370/254 |
| 2011/0273988 | A1* | 11/2011 | Tourrilhes et al. | 370/237 |
| 2012/0042095 | A1 | 2/2012 | Kotha et al. | |
| 2013/0034104 | A1* | 2/2013 | Yedavalli et al. | 370/400 |
| 2013/0128746 | A1* | 5/2013 | Yedavalli | 370/238 |
| 2013/0223226 | A1 | 8/2013 | Narayanan et al. | |

OTHER PUBLICATIONS

"OpenFlow: Enabling Innovation in Campus Networks," McKeown et al., Mar. 14, 2008 http://www.openflowswitch.org.

"SPARC—Split Architecture Introduction," Andreas Gladisch, Deutsche Telekom AG, T-Labs, SPARC Introduction, Brussels Concertation Meeting, Oct. 2010 http://cordis.europa.eu/fp7/ict/future-networks/documents/projects-sparc-presentation_en.pdf.

* cited by examiner

SYSTEM AND METHOD FOR MANAGING UNKNOWN FLOWS IN A FLOW-BASED SWITCHING DEVICE

CROSS REFERENCE TO RELATED APPLICATIONS

This application is a continuation-in-part of U.S. patent application Ser. No. 13/408,444, entitled "System and Method for Providing a Split Data Plane in a Flow-Based Switching Device," filed on Feb. 9, 2012, the disclosure of which is hereby expressly incorporated by reference in its entirety.

FIELD OF THE DISCLOSURE

The present disclosure generally relates to information handling systems, and more particularly relates to a flow-based switching device in a network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
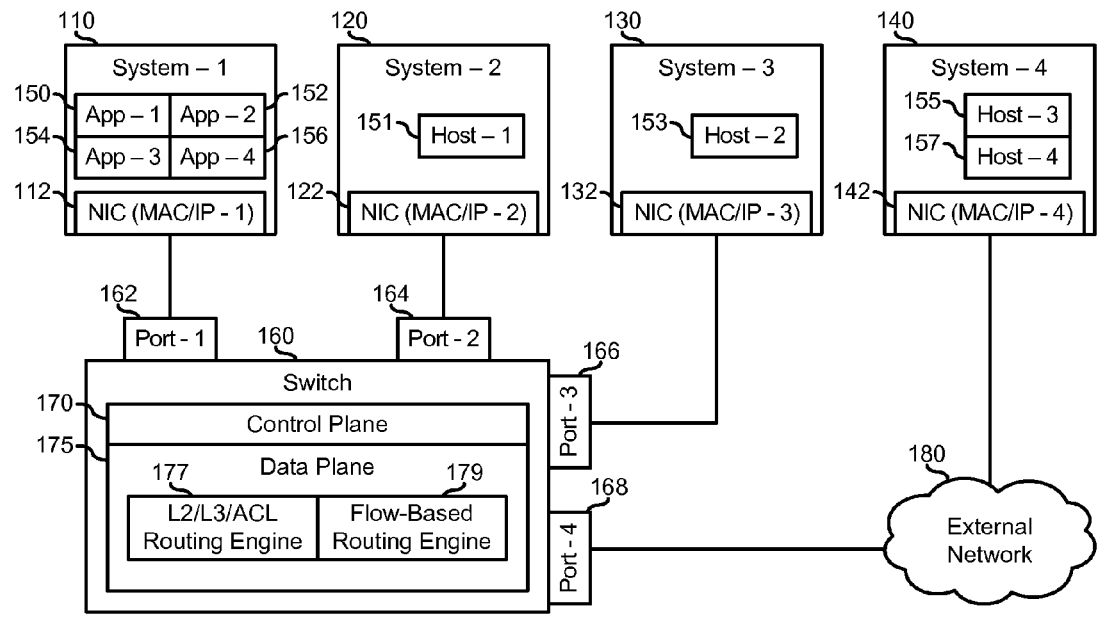
FIG. 1 is a block diagram of a network according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, network 100 includes networked systems 110, 120, 130, and 140, a flow-based switching device 160, and an external network 180. Systems 110, 120, 130, and 140 represent a variety of computing resources of network 100 including client information handling systems, data processing servers, network storage devices, local and wide area networks, or other resources as needed or desired. System 110 includes a network interface card (NIC) 112, system 120 includes a NIC 122, system 130 includes a NIC 132, and system 140 includes a NIC 142. NICs 112, 122, 132, and 142 represent network adapters that are operable to provide a data interface to transmit and receive data between the respective systems 110, 120, 130, and 140. As such, NICs 112, 122, 132, and 142 can represent add-in cards, network interfaces that are integrated with a main board of respective systems 110, 120, 130, and 140, another network interface capability, or a combination thereof. Each of NICs 112, 122, 132, and 142 are uniquely identified on network 100 via one or more unique identifiers. For example, NICs 112, 122, 132, and 142 can each be identified by one or more of a media access control (MAC) address, an Internet protocol (IP) address, a world wide name (WWN), or another unique identifier, as needed or desired.

Systems 110, 120, 130, and 140 are adapted to run one or more applications 150, 152, 154, and 156, or to run associated host applications 151, 153, 155, and 157. Thus, as illustrated, system 110 is running applications 150, 152, 154, and 156, system 120 is running host application 151 that is associated with application 150, system 130 is running host application 153 that is associated with application 152, and system 140 is running host application 155 that is associated with application 154 and host application 157 that is associated with application 156. For example, application 150 can represent an electronic mail client application that is associated with host application 151 that represents an electronic mail server, application 152 can represent a data storage client application that is associated with host application 153 that represents a data storage server, application 154 can represent a web browser application that is requesting web data from host application 155 that represents a hosted website, and application 156 can represent streaming multimedia content that is associated with host application 157 that represents a streaming multimedia server.

Flow-based switching device 160 includes ports 162, 164, 166, and 168. Switching device 160 operates to route data packets between ports 162, 164, 166, and 168. As such, switching device 160 receives data packets from ports 162, 164, 166, and 168, determines the destination for the data packets, and sends the data packets to the port that is associated with the destination. Port 162 is connected to NIC 112, port 164 is connected to NIC 122, port 166 is connected to NIC 132, and port 168 is connected via external network 180 to NIC 142. As such, data packets received from system 110 on port 162 will be directed to port 164, 166, or 168, based upon whether the data packets are destined for system 120, 130, or 140. Data packets from systems 120, 130, and 140 will similarly be directed to appropriate port 162, 164, 166, or 168.

Switching device 160 includes a control plane 170 and a data plane 175. Control plane 170 represents a central processing unit (CPU) complex and operates to provide network discovery, mapping, and management based upon various protocols, and provides for differentiated service within switching device 160. For example, control plane 170 can perform network discovery and mapping based upon a shortest path first (SPF) or open shortest path first (OSPF) protocol, a peer-to-peer protocol (PPP), a neighbor discovery protocol (NDP), a border gateway protocol (BGP), or another network mapping and discovery protocol. Control plane 110 can also provide network management based upon a simple network management protocol (SNMP), a trivial file transfer protocol (TFTP), a Telnet session, or another network management protocol.

Data plane 175 performs the routing functions of switching device 160 by receiving data packets from ports 162, 164, 166, and 168, determining the destination for the data packets, and sending the data packets to the port that is associated with the destination. The routing functions can be packet-based or flow-based. As such, data plane 175 includes a packet-based routing engine 177 and a flow-based routing engine 179. Packet-based routing engine 177 provides for routing behavior that is determined based upon the port that receives the data packets and a determination of the port to which the data packets are to be forwarded. For example, packet-based routing engine 177 can provide for routing based upon the Open Systems Interconnect (OSI) model for layer 2 and layer 3 data packet routing. Here, packet-based information is determined based upon header information of the data packets. For example, the header information can include a source MAC address, a source IP address, a destination MAC address, a destination IP address, another type of data packet header information, or a combination thereof. As such, packet-based routing engine 177 can include a routing table that associates certain destination addresses with the respective ports 162, 164, 166, and 168 that are used to forward the data packets.

Table 1 illustrates an example of a packet-based routing table for network 100. Here NIC 112 has a MAC address of 12:34:56:78:9a:bc, and an IP address of 000.111.001, NIC 122 has a MAC address of de:f0:12:34:56:78, and an IP address of 000.111.002, and NIC 132 has a MAC address of ab:12:cd:34:ef:56, and an IP address of 000.111.003. As such, data packets received by switching device 160 on ports 164, 166, or 168, and that have header information that includes the MAC address or the IP address for NIC 112, will be routed to port 162. Similarly, data packets received that have header information that matches the MAC address or the IP address for NICs 122 and 132 will be routed to ports 164 and 166, respectively. In a particular embodiment, packet-based routing engine 177 provides for routing behavior that is determined based upon other packet-based rules, such as those determined by an access control list (ACL), a firewall, a filter, another packet-based rule, or a combination thereof. In another embodiment, the packet-based routing table includes other fields for layer 2, layer 3, and ACL routing, as needed or desired.

TABLE 1

Packet-Based Routing Table

| Port Number | MAC Address | IP Address |
|---|---|---|
| 1 | 12:34:56:78:9a:bc | 000.111.001 |
| 2 | de:f0:12:34:56:78 | 000.111.002 |
| 3 | ab:12:cd:34:ef:56 | 000.111.003 |
| 4 | — | All Other |

Flow-based routing engine 179 provides for routing behavior that is determined based upon the particular flow of information with which the data packets are associated. A flow is a sequence of data packets sent from a particular source to a particular unicast, anycast, or multicast destination that the source desires to label as a flow, and can consist of all data packets in a specific transport connection or media stream. For example, a flow can be associated with a particular application, a user, a media stream, another flow identifier, or a combination thereof, as needed or desired. Flow-based routing engine 179 performs deep packet inspection to determine whether or not data packets received from servers 110, 120, 130, or 140 are associated with a flow. As such, flow-based routing engine 179 can include flow routing rules, a flow routing table, other flow control mechanisms, or a combination thereof, in order to ascertain that a certain data packet is associated with a flow, and to thereby determine a port 162, 164, 166, or 168 to which to forward the data packets.

Table 2 illustrates an example of a flow-based routing table for network 100. Here in addition to the MAC address and IP address routing associations, the table includes each identified flow, and the associated egress port, application, and user. Here, when a deep packet inspection of the data packets indicates that the data packets are associated with one of the identified flows, the data packet is routed to the associated port 162, 164, 166, or 168. For example, if a data packet is identified as being a data packet associated with an e-mail from a first user that is being sent to an e-mail server, then the data packet will be routed to the host e-mail server 151 on system 120. When host e-mail server 151 provides data packets back to the first user, the deep packet inspection of the data packet will reveal that the data packet is associated with flow—6, and the data packet will be routed via port 162 to e-mail application 150 on server 110. In a particular embodiment, flow-based routing engine 179 provides for routing behavior that is determined based upon other packet information, such as those determined by tuple inspection of the data packets, another flow-based rule, or a combination thereof. In another embodiment, the flow-based routing table includes other fields for flow-based routing, as needed or desired.

TABLE 2

Flow-Based Routing Table

| Port Number | MAC Address | IP Address | Application | Destination | User | Flow ID |
|---|---|---|---|---|---|---|
| 1 | 12:34:56:78:9a:bc | 000.111.001 | App. - 1 | Port 2 | 1 | 1 |
|   |   |   |   |   | 2 | 2 |
|   |   |   | App. - 2 | Port 3 | — | 3 |
|   |   |   | App. - 3 | Port 4 | — | 4 |
|   |   |   | App. - 4 | Port 4 | — | 5 |
| 2 | de:f0:12:34:56:78 | 000.111.002 | Host App. - 1 | Port 1 | 1 | 6 |
|   |   |   |   |   | 2 | 7 |
| 3 | ab:12:cd:34:ef:56 | 000.111.003 | Host App. -2 | Port 1 | All | 8 |
| 4 | — | All Other | Host App. -3 | Port 1 | All | 9 |
|   |   |   | Host App. - 4 | Port 1 | 1 | 10 |
|   |   |   |   |   | 2 | 11 |

Figure 2:
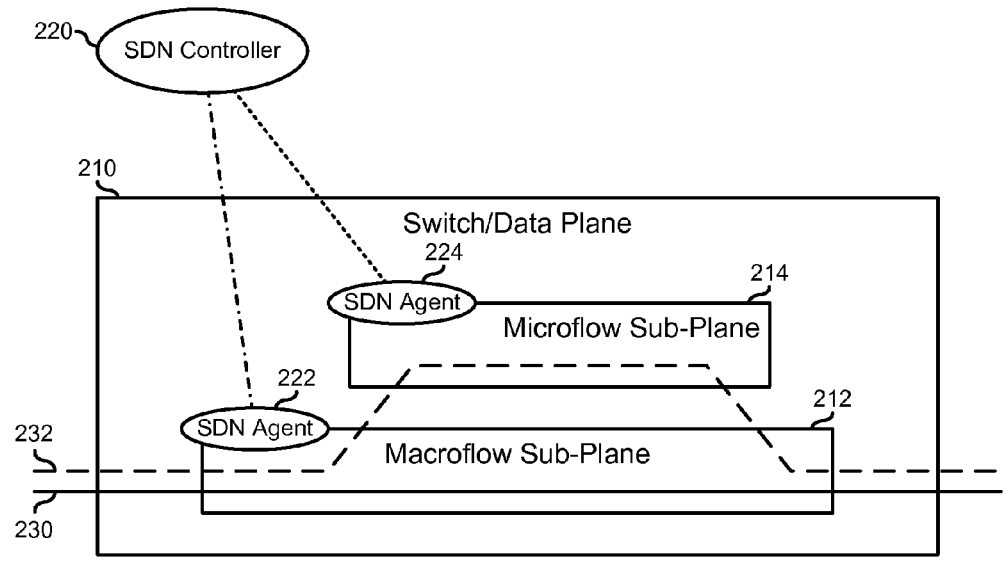
FIG. 2 is a block diagram of a flow-based switching device according to an embodiment of the present disclosure.

FIG. 2 illustrates a network 200 similar to network 100, including a flow-based switching device 210 and a software defined network (SDN) controller 220. Switching device 210 is similar to switching device 160, and has a split data plane including a macroflow sub-plane 212 and a microflow sub-plane 214. Macroflow sub-plane 212 can operate similarly to packet-based routing engine 177, and microflow sub-plane 214 can operate similarly to flow-based routing engine 179. In a particular embodiment, macroflow sub-plane 212 represents an application specific integrated circuit (ASIC) that is suitable to receive data packets on a port of switching device 210, and to quickly make routing decisions for the data packets using packet-based routing techniques as described above. For example, macroflow sub-plane 212 can be implemented via readily available, low cost, commercial ASIC product that is adapted to provide efficient packet based routing.

In a particular embodiment, microflow sub-plane 214 represents a processing capability of switching device 210 that is suitable to receive data packets on a port of switching device 210, and to quickly make routing decisions for the data packets using flow-based routing techniques as described above. For example, microflow sub-plane 214 can be implemented as a multi-core processing complex that is able to rapidly make multiple processor-intensive flow-based routing decisions. The split data plane thus provides an adaptable, scalable solution to increased flow-based traffic on network 200.

SDN controller 220 provides visibility into the switching paths of the network traffic through macroflow sub-plane 212 and microflow sub-plane 214, and permits the switching paths to be modified and controlled remotely. SDN controller 220 establishes a link with macroflow sub-plane 212 via an SDN agent 222 that operates on switching device 210, and establishes a link with microflow sub-plane 214 via an SDN agent 224 that operates on the switching device. SDN agents 222 and 224 permit secure communications between the SDN controller 210 and sub-planes 212 and 214. An example of an SDN includes a network that is controlled by an OpenFlow protocol, or another flow-based switching network instantiated in software. In a particular embodiment, switching device 210 operates to support virtual port addressing on macroflow sub-plane 212, on microflow sub-plane 214, or on both, as needed or desired.

Macroflow sub-plane 212 receives and routes data packets 230 and 232. As illustrated, macroflow sub-plane 212 receives both packets 230 and 232. Macroflow sub-plane 212 determines if the data packets are able to be routed based upon the data packet-based rules implemented by the macroflow sub-plane. If so, microflow sub-plane 212 routes the data-packets. For example, data packets 230 represent a group of data packets that can be routed based upon the data packet-based rules, and data packets 230 are shown as transiting switching device 210 through only macroflow sub-plane 212. However, if the data packets are not able to be routed based upon the data packet-based rules implemented by macroflow sub-plane 212, or if the data packets otherwise require further classification based upon a deep packet inspection, the data packets are sent to microflow sub-plane 214, and the microflow sub-plane routes the data packets. For example, data packets 232 represent a group of data packets that cannot be routed based upon the data packet-based rules, and data packets 232 are shown as transiting switching device 210 through both macroflow sub-plane 212 and microflow sub-plane 214.

Figure 3:
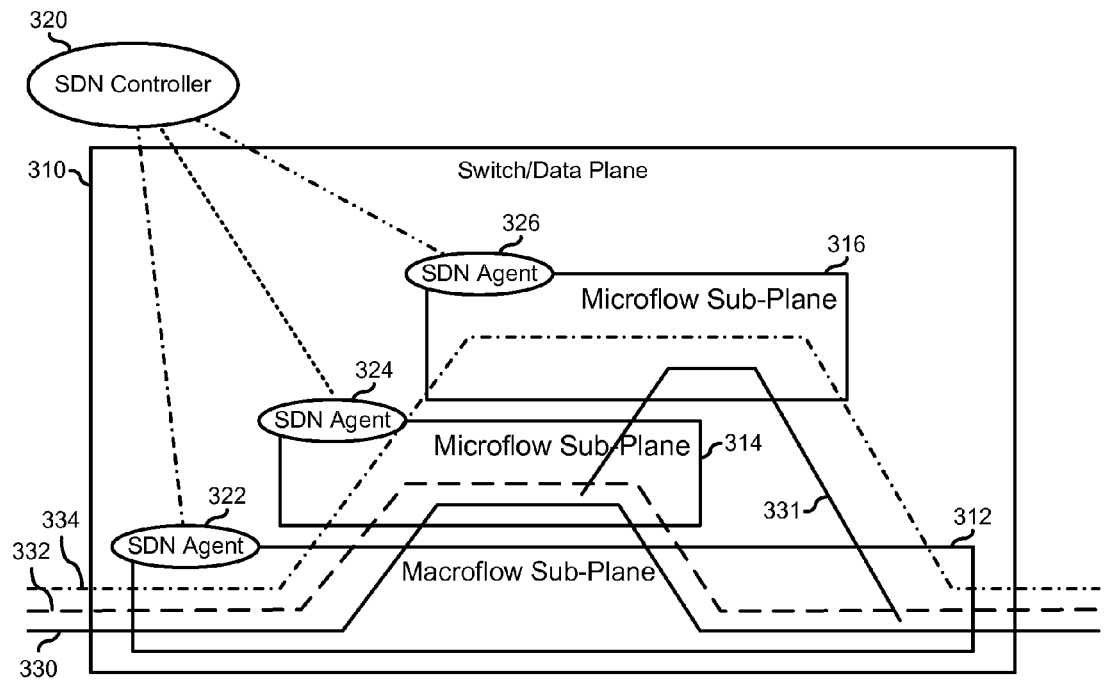
FIG. 3 is a block diagram of a flow-based switching device according to another embodiment of the present disclosure.

FIG. 3 illustrates a network 300 similar to network 200, including a flow-based switching device 310 and an SDN controller 320. Switching device 310 is similar to switching device 210, and has a split data plane including a macroflow sub-plane 312 and microflow sub-planes 314 and 316. Macroflow sub-plane 312 is similar to macroflow sub-plane 212, and microflow sub-planes 314 and 316 are similar to microflow sub-plane 214. In a particular embodiment, microflow sub-plane 314 is configured to route a set of flow-based traffic 332, while microflow sub-plane 316 is configured to route a different set of flow-based traffic 334. In another embodiment, all flow-based traffic 330 is first directed to microflow sub-plane 314, and a subset of the flow-based traffic 331 is then redirected to microflow sub-plane 316. In yet another embodiment, sub-planes 314 and 316 are dynamically configured to handle flow-based traffic based upon current conditions within switching device 310, as needed or desired. SDN controller 320 is similar to SDN controller 220, and establishes a link with macroflow sub-plane 312 via an SDN agent 322, a link with microflow sub-plane 314 via an SDN agent 324, and a link with microflow sub-plane 316 via an SDN agent 326.

Figure 4:
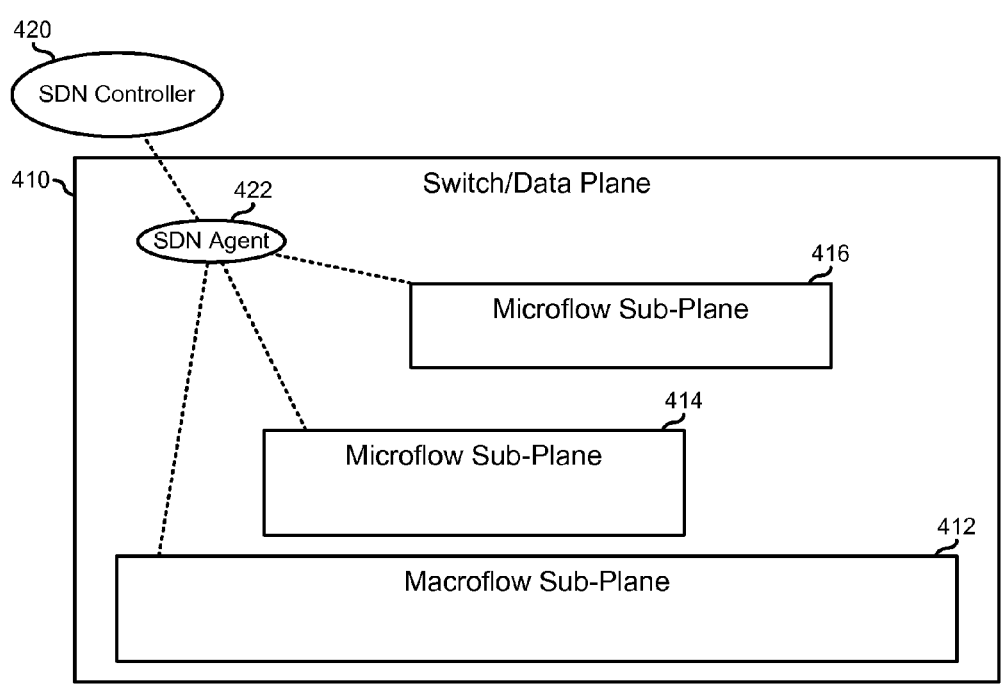
FIG. 4 is a block diagram of a flow-based switching device according to another embodiment of the present disclosure.

FIG. 4 illustrates a network 400 similar to network 300, including a flow-based switching device 410 and an SDN controller 420. Switching device 410 is similar to switching device 310, and has a split data plane including a macroflow sub-plane 412 and microflow sub-planes 414 and 416. Macroflow sub-plane 412 is similar to macroflow sub-plane 312, and microflow sub-planes 414 and 416 are similar to microflow sub-planes 314 and 316. SDN controller 420 is similar to SDN controller 320, and establishes a link with macroflow sub-plane 412, and with microflow sub-planes 414 and 416 via an SDN agent 422.

Figure 5:
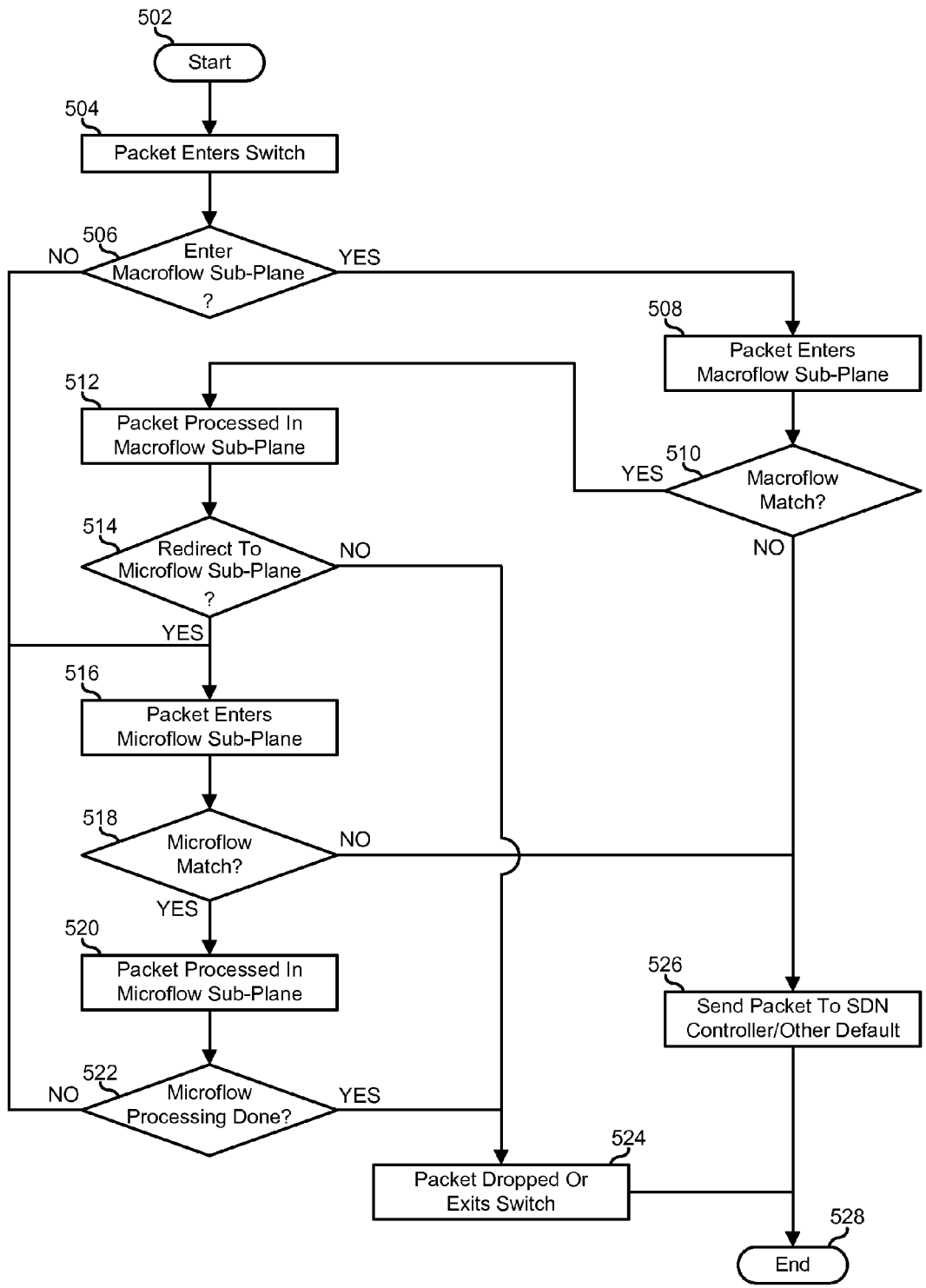
FIG. 5 is a flowchart illustrating a method of providing a split data plane in a flow-based switching device according to an embodiment of the present disclosure.

FIG. 5 illustrates a method of providing a split data plane in a flow-based switching device, starting at block 502. A packet enters a switching device in block 504. For example, a data packet can be received by flow-based switching device 210. A decision is made as to whether or not the packet should enter a macroflow sub-plane in decision block 506. For example, the data packet received by switching device 210 can be routed based upon packet-based routing rules and can thus be determined to be handled by macroflow sub-plane 212, or the packet can be routed based upon flow-based processing and can thus be determined to be handled by macroflow sub-plane 214. In a particular embodiment, decision block 504 can represent a decision that is made by a macroflow sub-plane, and thus the decision of decision block 504 is whether or not the received packet should stay in the macroflow sub-plane. If the packet should not enter the macroflow sub-plane, the "NO" branch of decision block 506 is taken, and the method continues in block 516, as described below.

If it is determined that the packet should enter the macroflow sub-plane, the "YES" branch of decision block 506 is taken, then the packet enters the macroflow sub-plane in block 508, and a decision is made as to whether or not there is a macroflow match in decision block 510. For example, the data packet received by switching device 210 can be inspected to see if a destination MAC address or a destination IP address is currently resident in a routing table associated with macroflow sub-plane 212. If there is not a macroflow match, the "NO" branch of decision block 510 is taken, the packet is sent to the SDN controller or another default action is taken in block 526, and the method ends at block 528. If there is a macroflow match in the macroflow sub-plane, the "YES" branch of decision block 510 is taken, and the packet is processed in the macroflow sub-plane in block 512.

A decision is made as to whether or not the packet is to be redirected from the macroflow sub-plane to the microflow sub-plane in decision block 514. For example, a packet can include a multicast media stream that is subject to processing in both the macroflow sub-plane and the microflow sub-plane, in which case, when the macroflow sub-plane processing is completed, the packet can be redirected to the microflow sub-plane. If the packet is not to be redirected from the macroflow sub-plane to the microflow sub-plane, the "NO" branch of decision block 514 is taken, the packet is dropped or routed to the appropriate exit port in block 524, and the method ends in block 528.

If either the packet should enter the macroflow sub-plane as determined in decision block 506 and the "NO" branch of decision block 506 is taken, or if the packet is to be redirected from the macroflow sub-plane to the microflow sub-plane as determined in decision block 514 and the "YES" branch of decision block 514 is taken, then the packet enters the microflow sub-plane in block 516. A decision is made as to whether or not there is a microflow match in decision block 518. For example, the data packet received by switching device 210 can be deep packet inspected to see if a tuple match resides in a routing table associated with microflow sub-plane 214. If there is not a microflow match, the "NO" branch of decision block 518 is taken, the packet is sent to the SDN controller or another default action is taken in block 526, and the method ends at block 528. If there is a microflow match in the microflow sub-plane, the "YES" branch of decision block 518 is taken, and the packet is processed in the microflow sub-plane in block 520. A decision is made as to whether or not the microflow processing is done in decision block 522. For example, a packet can be include a multicast media stream that is subject to processing in multiple microflow sub-planes, in which case, when the first microflow sub-plane processing is completed, the packet can be redirected to another microflow sub-plane. If the microflow processing is not done, the "NO" branch of decision block 522 is taken, and the method returns to block 516 where the packet enters another microflow sub-plane. If the microflow processing is done, the "YES" branch of decision block 522 is taken, the packet is dropped or routed to the appropriate exit port in block 524, and the method ends in block 528

Figure 6:
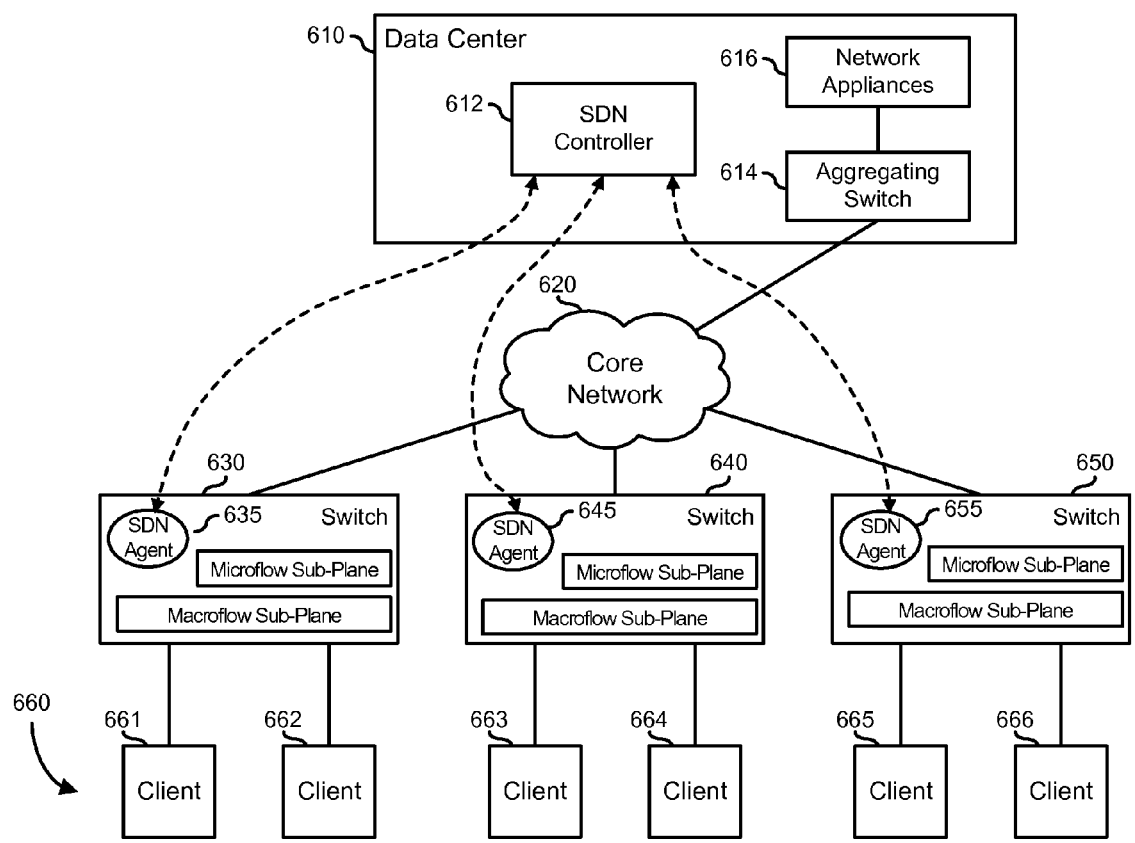
FIG. 6 is a block diagram illustrating a network including flow-based switching devices according to an embodiment of the present disclosure.

FIG. 6 illustrates a network 600 including a data center 610, a core network 620, flow-based switching devices 630, 640, and 650, and client systems 660. Data center 610 includes an SDN controller 612, an aggregating switch 614, and network appliances 616. Switching devices 630, 640, and 650 each include respective SDN agents 635, 645, and 655. Client systems 660 include clients 661-666. Data center 610 operates to provide computing services to clients 661-666. As such, aggregating switch 614 is connected to network appliances 614 and to core network 620. Switching device 630 is connected to core network 620 and to clients 661 and 662, switching device 640 is connected to core network 620 and to clients 663 and 664, and switching device 650 is connected to core network 620, and to clients 665 and 666. Data center 610 operates to provide computing services from network appliances 616 to clients 661-666. As such, data packets between network appliances 616 and clients 661-666 are routed through the respective switching devices 630, 640, and 650, and core network 620.

SDN controller 612 is connected to SDN agents 635, 645, and 655 to provide visibility into the switching paths of the network traffic through network 600, and to permit the switching paths to be modified and controlled remotely. In particular, SDN controller 612 operates to provide consistent routing policies to switching devices 630, 640, and 650. The routing policies can be macroflow routing policies, microflow routing policies, or a combination thereof, as needed or desired. For example, if a particular user is subject to specific limitations or restrictions, such as access to certain websites, a microflow policy can be applied to switching devices 630, 640, and 650, such that no matter which client 661-666 that the user logs onto, the limitations and restrictions can be enforced at the switching devices, rather than permitting the restricted traffic to transit core network 620 and to unnecessarily use the resources of data center 610. In another example, if an e-mail client application on client 661 is hacked, such that the client is sourcing spam e-mails to network 600, data center 610 can determine a signature for the spam attack, and SDN controller 612 can provide microflow policies to SDN agents 635, 646, and 665 to drop the spam traffic. In this way, if any additional clients 662-666 that become infected, the microflow policies are already in place to drop the spam traffic from network 600.

Figure 7:
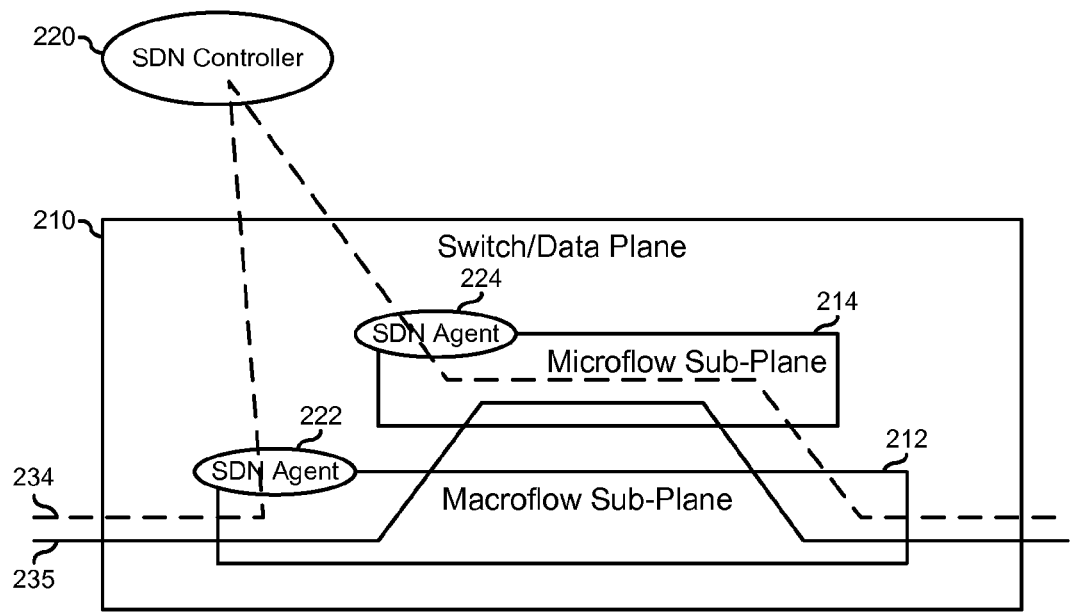
FIGS. 7 and 8 are block diagrams of embodiments of the flow-based switching device of FIG. 2.

FIG. 7 illustrates a particular embodiment of network 200. Here, macroflow sub-plane 212 receives data packet 234 which represents an unknown data packet. Macroflow sub-plane 212 forwards data packet 234 via SDN agent 222 to SDN controller 220. SDN controller 200 determines whether data packet 234 represents data associated with a new flow or with a previously expired flow, forwards the data packet to microflow sub-plane 214 via SDN agent 224, and modifies the switching paths of the microflow sub-plane such that the microflow sub-plane can recognize and route data packets associated with the new flow. Microflow sub-plane 214 then routes data packet 234. When macroflow sub-plane 212 receives subsequent data packets 235 that are associated with the new flow, the macroflow sub-plane forwards the data packets to microflow sub-plane 214 for routing.

Figure 8:
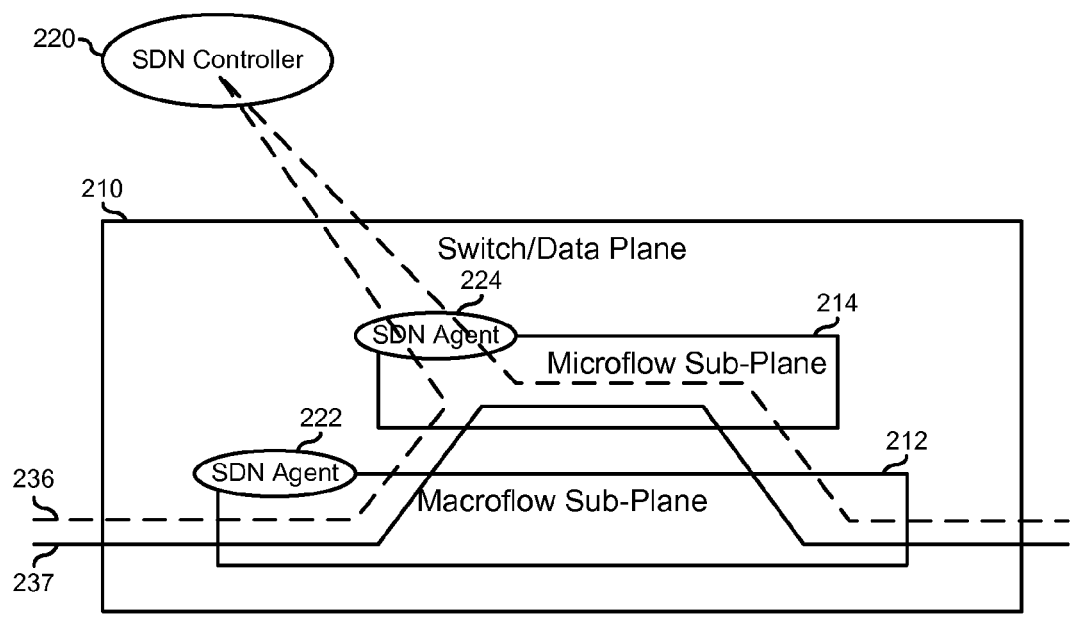

FIG. 8 illustrates another embodiment of network 200. Here, macroflow sub-plane 212 receives data packet 236 which represents another unknown data packet. Macroflow sub-plane 212 forwards data packet 234 to microflow sub-plane 214, which forwards the data packet via SDN agent 224 to SDN controller 220. SDN controller 200 determines whether data packet 234 represents data associated with a new flow or with a previously expired flow, forwards the data packet to microflow sub-plane 214 via SDN agent 224, and modifies the switching paths of the microflow sub-plane such that the microflow sub-plane can recognize and route data packets associated with the new flow. Microflow sub-plane 214 then routes data packet 236. When macroflow sub-plane 212 receives subsequent data packets 237 that are associated with the new flow, the macroflow sub-plane forwards the data packets to microflow sub-plane 214 for routing. In this embodiment, macroflow sub-plane 212 can be simplified, in that all microflows are forwarded to microflow sub-plane 214, and the macroflow sub-plane does not need to make any determinations regarding whether or not the microflow is known. Moreover, since macroflow sub-plane 212 is often implemented as a commercial switching ASIC product, the embodiment described in FIG. 7 may necessitate passing data packet 234 through a control plane of switching device 210 before the data packet is routed to SDN controller 220. Here, since microflow sub-plane 214 can represent a separate processing capability of switching device 210, the routing of data packet 236 to SDN controller 220 and the receiving of the modified switching paths for the microflow sub-plane can be performed more quickly than in the embodiment described in FIG. 7.

Figure 9:
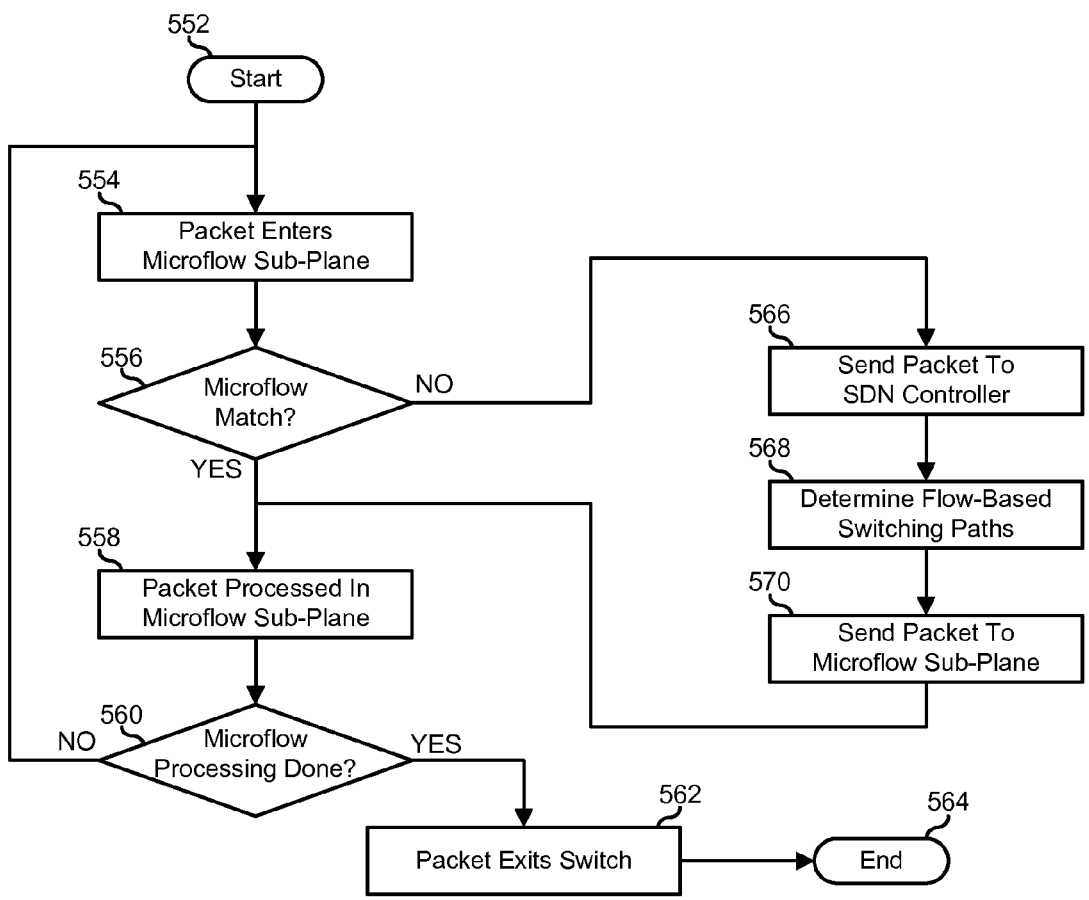
FIG. 9 is a flowchart illustrating a method of handling unknown flows in a flow-based switching device.

FIG. 9 illustrates a method of handling unknown flows in a flow-based switching device, starting at block 552. A data packet enters a microflow sub-plane of a flow based switching device in block 554. For example, data packet 236 can be sent from macroflow sub-plane 212 to microflow sub-plane 214. A determination is made as to whether or not the data packet matches a known microflow routing in decision block 556. If so, the "YES" branch of decision block 556 is taken, and the data packet is processed in the microflow sub-plane in block 558. A decision is made as to whether or not the processing of microflows is done in decision block 560. If not, the "NO" branch of decision block 560 is taken, and the method returns to block 554 where another data packet enters the microflow sub-plane. If the processing of microflows is done, The "YES" branch of decision block 560 is taken, the data packet is routed to its destination and exits the switch in block 562, and the method ends in block 564.

Figure 10:
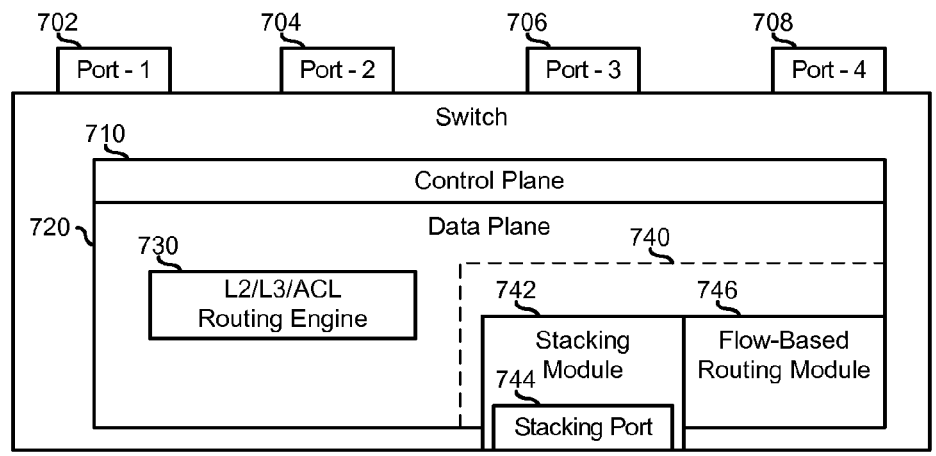
FIG. 10 is a block diagram of a flow-based switching device according to another embodiment of the present disclosure.

Returning to decision block 556, if the data packet does not match a known microflow, the "NO" branch of the decision block is taken, and the data packet it sent to an SDN controller for evaluation in block 566. For example, data packet 236 can be forwarded via SDN agent 224 to SDN controller 220. The SDN controller determines a flow-based switching path for the data packet in block 568. For example, SDN controller 220 can determine the switching paths for microflow sub-plane 214. The data packet and the switching paths are sent to the microflow sub-plane in block 570, and the method returns to block 558 where the data packet is processed in the microflow sub-plane FIG. 10 illustrates a flow-based switching device 700 similar to switching device 160, including ports 702, 704, 706, and 708. Switching device 700 includes a control plane 710 similar to control plane 170, and a data plane 720 similar to data plane 175. Data plane 720 performs the routing functions of switching device 700 by receiving data packets from ports 702, 704, 706, and 708, determining the destination for the data packets, and sending the data packets to the port that is associated with the destination. The routing functions can be packet-based or flow-based. As such, data plane 720 includes a packet-based routing engine 730 similar to packet-based routing engine 177 that provides for routing behavior that is determined based upon the port that receives the data packets and a determination of the port to which the data packets are to be forwarded. Data plane 720 also includes an expansion slot 740 for adding removable functional modules to switching device 700. The functional modules provide for flexibility in the usage and configuration of switching device 700. As such, switching device 700 includes a stacking module 742 and a flow based routing module 746. Stacking module 742 includes a stacking port 744 and operates to permit stacking of switching devices similar to switching device 700, in order to provide a seamless, high capacity switching capability. For example, a rack of servers within a data center can be configured with several switching devices similar to switching device 700, and that are connected together via their respective stacking ports. Here, the several switching devices operate as a single large switch, with a large number of ports to provide network routing for a large number of processing nodes within the rack. Stacking port 744 represents a high bandwidth port for directly routing control and data traffic between the switching devices. For example, stacking port 744 can represent one or more 10 giga-bit Ethernet (GbE) ports, one or more other high capacity data traffic port, or a combination thereof.

Flow-based routing module 746 is similar to flow-based routing engine 179, and provides for routing behavior that is determined based upon the particular flow of information with which the data packets are associated, and includes flow routing rules, a flow routing table, other flow control mechanisms, or a combination thereof, in order to ascertain that a certain data packet is associated with a flow, and to thereby determine a port 702, 704, 706, or 708 to which to forward the data packets. In a particular embodiment, flow-based routing module 746 represents an add-in module to switching device 700, and includes one or more dedicated networking processors that are optimized for flow-based network routing, and operates as a dedicated flow-based routing subsystem. For example, flow-based routing module 746 can be implemented as an information handling system as described below. As such, flow-based routing module 746 provides a secure sandbox mechanism for separating the execution of the flow-based routing operations from the rest of switching device 700, and includes dedicated memory resources and buffering capabilities that facilitate the flow-based network routing. In a particular embodiment, flow-based routing module 746 provides network security and hardware acceleration, including data encryption, data compression and decompression, and deep packet inspection pattern matching. In a particular embodiment, flow-based routing module 746 includes a security device, such as a Trusted Platform Module, that provides a security coprocessor and secure storage for cryptographic keys. As such, flow-based routing module 746 can implement a secure encrypted data link between an SDN agent operating on the flow-based routing module and an SDN controller, such as SDN controller 220, and in a trusted environment, data encryption can be offloaded to the flow-based routing module.

Figure 11:
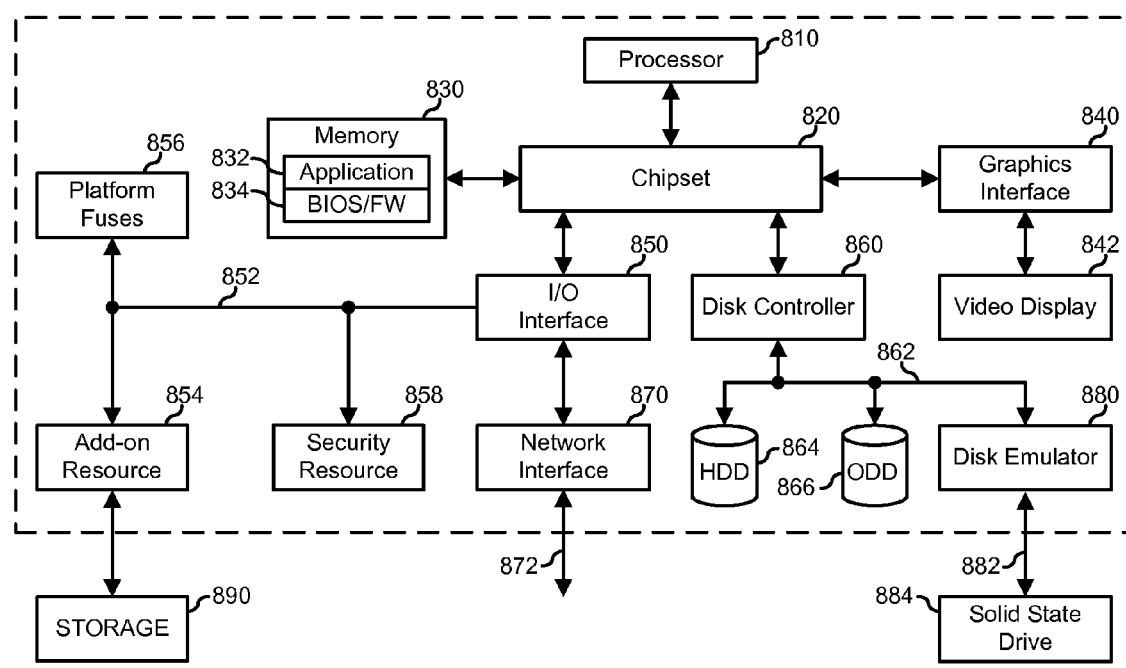
FIG. 11 is a block diagram illustrating an information handling system according to an embodiment of the present disclosure.

FIG. 11 is a block diagram illustrating an embodiment of an information handling system 800, including a processor 810, a chipset 820, a memory 830, a graphics interface 840, an input/output (I/O) interface 850, a disk controller 860, a network interface 870, and a disk emulator 880. In a particular embodiment, information handling system 800 is used to carry out one or more of the methods described herein. In another embodiment, one or more of the systems described herein are implemented in the form of information handling system 800.

Chipset 820 is connected to and supports processor 810, allowing the processor to execute machine-executable code. In a particular embodiment, information handling system 800 includes one or more additional processors, and chipset 820 supports the multiple processors, allowing for simultaneous processing by each of the processors and permitting the exchange of information among the processors and the other elements of the information handling system. Chipset 820 can be connected to processor 810 via a unique channel, or via a bus that shares information among the processor, the chipset, and other elements of information handling system 800.

Memory 830 is connected to chipset 820. Memory 830 and chipset 820 can be connected via a unique channel, or via a bus that shares information among the chipset, the memory, and other elements of information handling system 800. In another embodiment (not illustrated), processor 810 is connected to memory 830 via a unique channel. In another embodiment (not illustrated), information handling system 800 includes separate memory dedicated to each of the one or more additional processors. A non-limiting example of memory 830 includes static random access memory (SRAM), dynamic random access memory (DRAM), non-volatile random access memory (NVRAM), read only memory (ROM), flash memory, another type of memory, or any combination thereof.

Graphics interface 840 is connected to chipset 820. Graphics interface 840 and chipset 820 can be connected via a unique channel, or via a bus that shares information among the chipset, the graphics interface, and other elements of information handling system 800. Graphics interface 840 is connected to a video display 842. Other graphics interfaces (not illustrated) can also be used in addition to graphics interface 840 as needed or desired. Video display 842 includes one or more types of video displays, such as a flat panel display, another type of display device, or any combination thereof.

I/O interface 850 is connected to chipset 820. I/O interface 850 and chipset 820 can be connected via a unique channel, or via a bus that shares information among the chipset, the I/O interface, and other elements of information handling system 800. Other I/O interfaces (not illustrated) can also be used in addition to I/O interface 850 as needed or desired. I/O interface 850 is connected via an I/O interface 852 to one or more add-on resources 854. Add-on resource 854 is connected to a storage system 890, and can also include another data storage system, a graphics interface, a network interface card (NIC), a sound/video processing card, another suitable add-on resource or any combination thereof. I/O interface 850 is also connected via I/O interface 852 to one or more platform fuses 856 and to a security resource 858. Platform fuses 856 function to set or modify the functionality of information handling system 800 in hardware. Security resource 858 provides a secure cryptographic functionality and includes secure storage of cryptographic keys. A non-limiting example of security resource 858 includes a Unified Security Hub (USH), a Trusted Platform Module (TPM), a General Purpose Encryption (GPE) engine, another security resource, or a combination thereof.

Disk controller 860 is connected to chipset 820. Disk controller 860 and chipset 820 can be connected via a unique channel, or via a bus that shares information among the chipset, the disk controller, and other elements of information handling system 800. Other disk controllers (not illustrated) can also be used in addition to disk controller 860 as needed or desired. Disk controller 860 includes a disk interface 862. Disk controller 860 is connected to one or more disk drives via disk interface 862. Such disk drives include a hard disk drive (HDD) 864, and an optical disk drive (ODD) 866, and can include one or more disk drive as needed or desired. ODD 866 can include a Read/Write Compact Disk (R/W-CD), a Read/Write Digital Video Disk (R/W-DVD), a Read/Write mini Digital Video Disk (R/W mini-DVD), another type of optical disk drive, or any combination thereof. Additionally, disk controller 860 is connected to disk emulator 880. Disk emulator 880 permits a solid-state drive 884 to be coupled to information handling system 800 via an external interface 882. External interface 882 can include industry standard busses such as USB or IEEE 1394 (Firewire) or proprietary busses, or any combination thereof. Alternatively, solid-state drive 884 can be disposed within information handling system 800.

Network interface device 870 is connected to I/O interface 850. Network interface 870 and I/O interface 850 can be coupled via a unique channel, or via a bus that shares information among the I/O interface, the network interface, and other elements of information handling system 800. Other network interfaces (not illustrated) can also be used in addition to network interface 870 as needed or desired. Network interface 870 can be a network interface card (NIC) disposed within information handling system 800, on a main circuit board such as a baseboard, a motherboard, or any combination thereof, integrated onto another component such as chipset 820, in another suitable location, or any combination thereof. Network interface 870 includes a network channel 872 that provide interfaces between information handling system 800 and other devices (not illustrated)

that are external to information handling system 800. Network interface 870 can also include additional network channels (not illustrated).

Information handling system 800 includes one or more application programs 832, and Basic Input/Output System and Firmware (BIOS/FW) code 834. BIOS/FW code 834 functions to initialize information handling system 800 on power up, to launch an operating system, and to manage input and output interactions between the operating system and the other elements of information handling system 800. In a particular embodiment, application programs 832 and BIOS/FW code 834 reside in memory 830, and include machine-executable code that is executed by processor 810 to perform various functions of information handling system 800. In another embodiment (not illustrated), application programs and BIOS/FW code reside in another storage medium of information handling system 800. For example, application programs and BIOS/FW code can reside in HDD 864, in a ROM (not illustrated) associated with information handling system 800, in an option-ROM (not illustrated) associated with various devices of information handling system 800, in storage system 890, in a storage system (not illustrated) associated with network channel 872, in another storage medium of information handling system 800, or a combination thereof. Application programs 832 and BIOS/FW code 834 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network switching device comprising:
a macroflow sub-plane that performs packet-based routing in the network switching device;
an expansion slot;
a first microflow routing module that performs flow-based routing in the network switching device, the first microflow routing module being installed into the expansion slot and separable from the network switching device, and being operable to:
receive from the macroflow sub-plane a first data packet, wherein the first data packet is associated with a first unknown flow on the network switching device;
receive via a first OpenFlow software defined network (SDN) agent a first flow-based routing rule from a SDN controller; and
route the first data packet based upon the first flow-based routing rule; and
a second microflow routing module that performs flow-based routing in the network switching device, the second microflow routing module to:
receive via a second SDN agent a second flow-based routing rule from the SDN controller;
receive from the macroflow sub-plane a second data packet; and
route the second data packet based upon the second flow-based routing rule.

2. The network switching device of claim 1, the first microflow routing module further operable to:
route a third data packet associated with the first unknown flow based upon the first flow-based routing rule.

3. The network switching device of claim 1, the second microflow routing module further to:

receive via the second SDN agent a third flow-based routing rule from the SDN controller;
receive a third data packet from the first microflow routing module; and
route the third data packet based upon the third flow-based routing rule.

4. The network switching device of claim 1, further comprising:
a stacking module that provides for stacking the network switching device with another network switching device, the stacking module being installed in the expansion slot and separable from the network switching device.

5. The network switching device of claim 1, wherein the first microflow routing module provides a secure sandbox mechanism for separating flow-based routing from packet-based routing within the network switching device.

6. The network switching device of claim 1, wherein the first microflow routing module provides hardware acceleration for the network switching device.

7. The network switching device of claim 6, wherein the hardware acceleration includes at least one of data compression, data decompression, and deep packet inspection pattern matching.

8. The network switching device of claim 1, wherein the first microflow routing module provides network security for the network switching device.

9. The network switching device of claim 8, wherein the network security includes at least one of data encryption and data decryption.

10. The network switching device of claim 8, wherein the first microflow routing module includes a security device that provides a security coprocessor and secure storage for cryptographic keys.

11. A method comprising:
receiving at a macroflow sub-plane of a network switching device a first data packet associated with a first flow, wherein the first flow is an unknown flow on the network switching device;
providing the first data packet to a first microflow sub-plane of the network switching device;
providing, by the first microflow sub-plane, the first data packet via a first OpenFlow software defined network (SDN) agent of the first microflow sub-plane to an SDN controller;
determining, by the SDN controller, a first flow-based routing rule based upon the first data packet;
receiving via the first SDN agent the first flow-based routing rule from the SDN controller;
providing, by the first SDN agent, the flow-based routing rule to the first microflow sub-plane;
routing the first data packet with the first microflow sub-plane based upon the first flow-based routing rule;
providing, from the first microflow sub-plane and to a second microflow sub-plane of the network switching device, a second data packet;
receiving via a second SDN agent of the second microflow sub-plane a second flow-based routing rule from the SDN controller;
providing, by the second SDN agent, the second flow-based routing rule to the second microflow sub-plane; and
routing the second data packet with the second microflow sub-plane based upon the second flow-based routing rule.

12. The method of claim 11, further comprising:
routing a third data packet associated with the same flow as the first data packet based upon the first flow-based routing rule.

13. The method of claim 11, wherein the second data packet is provided to the first microflow sub-plane from the macroflow subplane.

14. The method of claim 11, wherein the first flow-based routing rule is received from the SDN controller based upon a current condition within the switching device.

15. The method of claim 11, further comprising:
receiving, by the second SDN agent, a third flow-based routing rule from the SDN controller;
providing, by the second SDN agent, the third flow-based routing rule to the second microflow sub-plane;
receive, at the second microflow sub-plane, a third data packet; and
routing, by the second microflow sub-plane, the third data packet based upon the third flow-based routing rule.

16. A non-transitory computer-readable medium including code for performing a method, the method comprising:
receiving at a macroflow sub-plane of a network switching device a first data packet associated with a first flow, wherein the first flow is an unknown flow on the network switching device;
providing the first data packet to a first microflow sub-plane of the network switching device;
providing, by the first microflow sub-plane, the first data packet via a first OpenFlow software defined network (SDN) agent of the first microflow sub-plane to an SDN controller;
determining, by the SDN controller, a first flow-based routing rule based upon the first data packet;
receiving via the first SDN agent the first flow-based routing rule from the SDN controller;
providing, by the first SDN agent, the flow-based routing rule to the first microflow sub-plane;
routing the first data packet with the first microflow sub-plane based upon the first flow-based routing rule;
providing, to a second microflow sub-plane of the network switching device, a second data packet;
receiving via a second SDN agent of the second microflow sub-plane a second flow-based routing rule from the SDN controller;
providing, by the second SDN agent, the second flow-based routing rule to the second microflow sub-plane; and
routing the second data packet with the second microflow sub-plane based upon the second flow-based routing rule.

17. The computer-readable medium of claim 16, wherein the second data packet is provided to the second microflow sub-plane from the macroflow subplane.

18. The computer-readable medium of claim 16, wherein the second data packet is provided to the second microflow sub-plane from the first microflow subplane.

19. The computer-readable medium of claim 16, wherein the first flow-based routing rule is received from the SDN controller based upon a current condition within the switching device.

* * * * *